Patented Apr. 24, 1934

1,956,290

UNITED STATES PATENT OFFICE 1,956,290

PREPARATION OF COFFEE

Herman Heuser, Evanston, Ill.

No Drawing. Application November 16, 1932, Serial No. 642,977

15 Claims. (Cl. 99—11)

This invention relates to the preparation of the beverage known as coffee made by extracting with water the roasted seeds or berries obtained from the fruit of a tree belonging to the natural order termed cinchonaceae, of which the best known specie is *Chinchonaceae arabica* cultivated in nearly all tropical countries.

The roasting of the coffee berries, a sort of dry distillation in its first stages, makes the tough berries porous and grindable and also imparts to the coffee the empyreumatic substances so agreeable to our oleofactory organs, and further it gives to the coffee a good looking brown or brown black color. In addition, however, the roasting makes the coffee deliquescent, the color and the deliquescent property being mostly due to the caramel produced from the sugar, dextrine and starch of the coffee berries.

While the dry heat during the roasting of the coffee produces the agreeable taste, flavor and aroma characteristics peculiar to roasted coffee, I find that the action of moisture coming into play, when the coffee brew is made from the ground roasted berries, effaces very largely the agreeable coffee characteristics produced during the roasting of the coffee berries.

I have discovered that the reason for the moisture acting detrimentally upon the characteristic substances of roasted coffee is due to the presence of oxygen during the brewing of the coffee. Oxygen is also introduced into the coffee beverage with the water used for coffee making. The roasted coffee, like charcoal, absorbs oxygen from the atmosphere to a remarkable extent, and holds such oxygen in an occluded state, in which condition the oxygen apparently becomes potentially very active, and rapidly oxidizes the empyreumatic constituents of the coffee such as the caffeol, when water is poured upon the coffee. The high heat of the coffee water accelerates the action of the oxygen.

I have further discovered that the detrimental effects of the oxygen upon the quality of the coffee beverage are avoided, when the extraction of the coffee is carried out with a small amount of a suitable reducing agent previously added to the ground coffee or to the water, with which the coffee is extracted. As suitable reducing agents I generally employ the sulphites, particularly the water-soluble sulphites, hyposulphites and pyrosulphites. Harmless organic reducing agents may likewise be employed, such as formic acid, or formates such as sodium formate. I have also employed sulphurous acid, hypophosphorus acid and sulphur dioxide with entirely satisfactory results, and I may employ any other suitable reducing agent possessing a higher affinity for oxygen than the coffee material, and which will act in a mildly acid medium.

In the proportions used the coffee tastes neither of the reducing agent nor the resulting oxidized product.

In the following is described a process suitable to carry out this invention. The commonly used drip coffee machine consisting of the coffee pot or can and the percolator placed in the top of the coffee pot may be employed.

The ground coffee is weighed and to the same is added a small quantity of a suitable reducing agent, in the present instance, $\frac{1}{16}$ part by weight of sodium pyrosulphite to one hundred parts by weight of ground roasted coffee. The coffee machine may then be rinsed out with boiling hot water to warm it, and thereupon, after removing the rinsing water from the coffee machine, the ground coffee containing the reducing agent is placed in the percolator and then boiling hot water in the usual quantity poured upon it. This quantity is on the average about 16 times as large in weight as the weight of the coffee. Thus, when 4 ounces by weight of coffee is used, 2 quarts of boiling hot water is added. As the reducing agent dissolves in the boiling hot water, it removes the oxygen from the ground coffee material and the water on account of its great affinity for oxygen. After the dripping of the coffee from the percolator into the coffee pot has ceased, the coffee is ready for consumption.

If the sulphite is added to the coffee water instead of the ground coffee, it is added in the proportion of $\frac{3}{16}$ part of sulphite to one thousand six hundred parts of water (0.0188%).

The coffee beverage thus prepared is not only distinguished in that it possesses an exceptionally rich coffee taste and coffee flavor, but it is also distinguished in that it possesses a much richer coffee aroma than the customary prepared beverage, and that upon prolonged standing it does not show any depreciation for an unusually long period of time. These improvements in the quality of the coffee hold good, no matter what particular coffee making process or coffee making apparatus is employed for carrying out my invention, the resulting beverage is always very much superior in quality to the beverage made without the use of my invention, even if the amount of sulphite employed is somewhat smaller than the amount employed aforesaid.

The efficacy of this invention for coffee making does not depend upon the particular temperature of the water used for coffee making, the coffee water may be hot, lukewarm or of ordinary room temperature, for the reducing agents usually employed are soluble in hot as well as in cold water. However, with the use of hot water customarily employed for the extraction of coffee the action of the reducing agent upon the coffee material is accelerated.

It is preferred to market a coffee having the reducing agent incorporated with it in proper proportion. By doing this the use of the invention gives no extra work of any kind to the coffee maker. In the following I will describe a process suitable to incorporate ground coffee with the reducing agent:

The roasted coffee may be ground to a granular condition or to a powder in a closed grinding machine, from which it drops into a closed mixing machine, placed on a scale. At the same time a suitable solid reducing agent, preferably a non-deliquescent, water-soluble reducing agent, say sodium pyrosulphite, is ground to a powder. When the required amount of ground coffee is in the mixing machine, the grinding is stopped. Now the finely comminuted sodium pyrosulphite is added to the coffee of the mixing machine in the proportion of $\frac{3}{10}$ part of sodium pyrosulphite to one hundred parts of ground coffee. The addition of the sulphite is made slowly, while the mixing machine is in operation. After the sulphite addition, the mixing continues, until the mixture is uniform. The sodium pyrosulphite because of its grinding to a fine condition and because of its being always dry, mixes extremely well with the coffee, ground coarse or fine, as may be desired. Therefore, the operation of mixing the ground coffee with the sodium pyrosulphite to perfect uniformity takes relatively little time. The product likewise has the advantage that the reducing agent does not separate or settle out on handling or standing.

The product thus produced by incorporating the white reducing agent into the ground brown or brown black coffee looks exactly like the customary ground coffee not only in color but also in every other way, it also has identically the same taste, flavor and aroma as the customary coffee. However, it keeps very much better in the trade packages than the customary coffee, and this is particularly the case, when the packaging of the coffee took place in damp or rainy weather or when the coffee is stored in a damp place. Such coffee being deliquescent because of its caramel content absorbs from damp air moisture, which by activating the oxygen in the coffee would induce oxidation of the empyreumatic and fatty constituents of the coffee, whereby the coffee will lose its flavor and will become rancid, (in case of enough moisture having been absorbed by the coffee) except for the presence of the reducing agent. The sulphite in the coffee being activated by the moisture binds the oxygen and thereby effectually prevents the aforesaid depreciation of the coffee, it also prevents depreciation of the coffee by the growth of the oxygen-requiring mould fungi liable to be present in the coffee.

The incorporation of the whole coffee berries with a reducing agent in solid form is more of a problem. The berries being of such large size, it is extremely difficult to maintain a uniform distribution of the small percentage of reducing agent. However, with a suitable gaseous reducing agent such as sulphur dioxide it can be carried out promptly and uniformly, and it is best carried out by burning a certain amount of sulphur, say 0.05 parts by weight, and introducing the sulphur dioxide produced thereby into a certain amount of roasted coffee berries say, 100 parts by weight, kept in an enclosed space preferably in a revolving horizontal drum or cylinder loaded with the roasted berries.

The proportion in which I have added the reducing agent to the ground or unground roasted coffee or incorporated into the ground or unground roasted coffee may be raised or lowered somewhat without fundamentally altering the benefits obtained by the use of my invention.

The foregoing detailed description has been given for clearness of understanding only, and no unnecessary limitations should be understood therefrom, but the appended claims should be construed as broadly as permissible, in view of the prior art.

I claim:

1. In the process of making a coffee beverage from roasted coffee the step which comprises brewing said coffee in the presence of a reducing agent.

2. In the process of making a coffee beverage from roasted coffee the step which comprises adding $\frac{3}{10}\%$ (based on the weight of the coffee berries) of sodium pyrosulphite to the coffee berries, and brewing said coffee in the presence of the pyrosulphite.

3. The process of brewing coffee which comprises adding roasted coffee berries and a minor quantity of a reducing agent to hot water.

4. The process of producing a stable roasted coffee berry which comprises maintaining in contact therewith a minor proportion of a reducing agent.

5. The process of producing a stable coffee berry which comprises roasting the coffee berries, grinding said berries and thoroughly admixing and maintaining therewith a minor proportion of a comminuted non-deliquescent, water soluble sulphite.

6. The method as set forth in claim 5, in which said sulphite is sodium pyrosulphite.

7. The method as set forth in claim 5 in which said reducing agent is $\frac{3}{10}\%$ of comminuted sodium pyrosulfite.

8. The process for stabilizing roasted coffee, which comprises incorporating therewith a gaseous reducing agent, and maintaining said gas in contact therewith.

9. The process for stabilizing roasted coffee, which comprises incorporating and maintaining in contact therewith a minor proportion by weight of sulfur dioxide.

10. As a composition of matter roasted coffee berries and a minor proportion of a reducing agent.

11. As a composition of matter roasted, ground coffee berries and a minor proportion of a sulphite.

12. As a composition of matter roasted, ground coffee berries and a minor proportion of a non-deliquescent, water soluble sulphite.

13. As a composition of matter roasted, ground coffee berries and $\frac{3}{10}\%$ of sodium pyrosulphite.

14. As a composition of matter roasted coffee berries and a minor proportion of sulfur dioxide.

15. As a composition of matter roasted coffee berries containing a minor proportion of absorbed gaseous reducing agent.

HERMAN HEUSER.